United States Patent
Feng et al.

(10) Patent No.: US 7,342,978 B2
(45) Date of Patent: Mar. 11, 2008

(54) METHOD AND APPARATUS FOR PAPR REDUCTION OF AN OFDM SIGNAL

(75) Inventors: Chih-Chun Feng, Beigang Township, Yunlin County (TW); Chih-Yaw Wang, Huatan Shiang (TW)

(73) Assignee: Industrial Technology Research Institute, Hsinchu (TW)

( * ) Notice: Subject to any disclaimer, the term of this patent is extended or adjusted under 35 U.S.C. 154(b) by 778 days.

(21) Appl. No.: 10/859,758

(22) Filed: Jun. 2, 2004

(65) Prior Publication Data
US 2005/0270968 A1     Dec. 8, 2005

(51) Int. Cl.
*H04L 27/00*     (2006.01)
*H04L 25/03*     (2006.01)
*H04J 11/00*     (2006.01)

(52) U.S. Cl. ............ 375/295; 375/297; 370/210
(58) Field of Classification Search ......... 375/260, 375/295, 296, 297, 259; 370/203, 210, 261, 370/276, 343, 319, 405; 708/403, 400, 404
See application file for complete search history.

(56) References Cited

U.S. PATENT DOCUMENTS

| | | | |
|---|---|---|---|
| 6,125,103 A |  9/2000 | Bauml et al. ............... 370/203 |
| 6,556,557 B1 |  4/2003 | Cimini, Jr. et al. ......... 370/342 |
| 6,952,394 B1 * | 10/2005 | Kim et al. .................. 370/208 |
| 7,184,490 B1 * |  2/2007 | Rybicki et al. ............. 375/297 |
| 2001/0036151 A1 | 11/2001 | Cimini, Jr. et al. ......... 370/210 |
| 2003/0067866 A1 |  4/2003 | Jung .......................... 370/210 |
| 2003/0202460 A1 * | 10/2003 | Jung et al. .................. 370/208 |
| 2004/0146115 A1 * |  7/2004 | Feng et al. ................. 375/260 |
| 2005/0265468 A1 * | 12/2005 | Fujii et al. .................. 375/260 |
| 2006/0193393 A1 * |  8/2006 | Shen et al. ................. 375/260 |

OTHER PUBLICATIONS

Lim et al., "A PTS OFDM Scheme with Low Computational Complexity," Information Theory 2005, ISIT 2005, Proceeding International Symosium Sep. 4-9, 2005, pp. 1141-1144.*
Leonard J. Cimini, Jr., Nelson R. Sollenberger, "Peak-to-Average Power Ratio Reduction of an OFDM Signal Using Partial Transmit Sequences", IEEE Communications Letters, vol. 4, No. 3, Mar. 2000, p. 86-88.

(Continued)

*Primary Examiner*—Tesfaldet Bocure

(57) ABSTRACT

An apparatus and a method for peak-to-average power ratio reduction of an OFDM signal are disclosed. The method uses the interleaved characteristics of partial transmit sequences to partition input data x[n] of length N into several disjoint subblocks in time domain, and a complete N-point signal x̃[n] is composed after phase optimization, where N is the length of an OFDM signal and n=0, 1, . . . , N−1. Accordingly, the apparatus comprises an N-point inverse fast Fourier transform (N-IFFT), a demultiplexer, a combiner, a set of memory and an adder. This invention uses only one N-IFFT, whereby it can achieve significant computation reduction. This invention requires $(N/2)\log_2 N$ complex multiplications and N memory units. It also preserves the inherent property as well as advantages of an OFDM system.

12 Claims, 12 Drawing Sheets

OTHER PUBLICATIONS

Chih-Chun Feng, Chih-Yaw Wang, Chun-Yu Lin, and Yung-Hua Hung, "Protection and Transmission of Side Information for Peak-to-Average Power Ratio Reduction of an OFDM Signal Using Partial Transmit Sequences", 0-7803-7954-3/03/$17.00© 2003 IEEE, p. 2461-2465.

Stefan H. Muller and Johannes B. Huber, A Novel Peak Power Reduction Scheme for OFDM, 0-7803-3871-5/97/$10.00© 1997IEEE, p. 1090-1094.

Seog Geun Kang, Jeong Goo Kim, and Eon Kyeong Joo, "A Novel Subblock Partition Scheme for Partial Transmit Sequence OFDM", IEEE Transactions on Broadcasting. vol. 45,No. 3, Sep. 1999, p. 333-p. 338.

G.Hill, M. Faulkner and J.singh, "Cyclic Shifting and Time Inversion of Partial Transmit Sequences to Reduce the Peak-to-Average Power Ratio in OFDM", p. 1256-p. 1259, IEEE 2000.

S.H. Muller and J.B. Huber, "OFDM with reduced peak-to-average power ratio by optimum combination of partial transmit sequences", Electronics Letters Feb. 27, 1997, vol. 33, No. 5, p. 368-p. 369.

G.R. Hill, M. Faulkner and J. Singh, "Reducing the peak-to-average power ratio in OFDM by cyclically shifting partial transmit sequences", Electronnics Letters Mar. 16, 2000 vol. 36 No. 6, p. 560-p. 561.

* cited by examiner $$n = \frac{pN}{2} \sim \frac{(p+1)N}{2} - 1, \ p = 0, 1$$

| n | $\tilde{b}_1$ | $\tilde{b}_2$ |
|---|---|---|
| $0 \sim \frac{N}{2}-1$ | $b_1$ | $b_2$ |
| $\frac{N}{2} \sim N-1$ | $b_1$ | $-b_2$ |

FIG. 9

$$n = \frac{pN}{4} \sim \frac{(p-1)N}{4} - 1, \ p = 0, 1, 2, 3$$

| n | $\tilde{b}_1$ | $\tilde{b}_2$ | $\tilde{b}_3$ | $\tilde{b}_4$ |
|---|---|---|---|---|
| $0 \sim \frac{N}{4}-1$ | $b_1$ | $b_2$ | $b_3$ | $b_4$ |
| $\frac{N}{4} \sim \frac{N}{2}-1$ | $b_1$ | $jb_2$ | $-b_3$ | $-jb_4$ |
| $\frac{N}{2} \sim \frac{3N}{4}-1$ | $b_1$ | $-b_2$ | $b_3$ | $-b_4$ |
| $\frac{3N}{4} \sim N-1$ | $b_1$ | $-jb_2$ | $-b_3$ | $jb_4$ |

FIG. 11

| IFFT size | original PTS | | Kang, Kim & Joo | | Samsung | | present invention | |
|---|---|---|---|---|---|---|---|---|
| | number of multiplications | number of memory units | number of multiplications | number of memory units | number of multiplications | number of memory units | number of multiplications | number of memory units |
| N=64 | 768 | 512 | 384 | 512 | 192 | 64 | 192 | 64 |
| N=256 | 4096 | 2048 | 1792 | 2048 | 1024 | 256 | 1024 | 256 |
| N=1024 | 20480 | 8192 | 8192 | 8192 | 5120 | 1024 | 5120 | 1024 |
| N=2048 | 45056 | 16384 | 17408 | 16384 | 11264 | 2048 | 11264 | 2048 |

FIG. 12

METHOD AND APPARATUS FOR PAPR REDUCTION OF AN OFDM SIGNAL

FIELD OF THE INVENTION

The present invention generally relates to the technology for solving the problem of peak-to-average power ratio (PAPR) of an orthogonal frequency division multiplexing (OFDM) signal at transmission side, and more specifically to a method for PAPR reduction of an OFDM signal, and an apparatus of performing the same.

BACKGROUND OF THE INVENTION

Multicarrier communication systems such as discrete multitone (DMT) and OFDM systems have attracted much attention in the applications of high-speed communication. The applications include digital subscriber line (DSL), digital terrestrial broadcasting, wireless local area network (WLAN), wireless metropolitan area network (WMAN), dedicated short range communication (DSRC) and power line communication. They are also becoming the main stream of the next generation mobile communication. The advantages of the multicarrier communication systems lie in partitioning a high-speed data stream into a plurality of parallel data streams, each transmitted by a subcarrier. As such, each data stream is transmitted at low speed, and thus has a stronger capability in anti-multipath channel effect and narrowband interference.

FIG. 1 shows a block diagram of a conventional OFDM transmitter. In the OFDM transmitter, the input data X[k], k=0, 1, . . . , N−1, are transmitted in an OFDM symbol period. After the serial/parallel transformation, N-point inverse fast Fourier transform (N-IFFT), and parallel/serial transformation, the input data are transformed into the following discrete time sequence:

$$x[n] = \frac{1}{\sqrt{N}} \sum_{k=0}^{N-1} X[k] W_N^{kn}, n = 0, 1, \ldots, N-1 \quad (1)$$

where $$W_N = e^{j2\pi/N} \quad (2)$$

is the twiddle factor. The discrete time sequence x[n] obtained from equation (1) undergoes the cyclic prefix insertion and digital/analog transformation to obtain an analog signal x(t). The analog signal x(t) is then transmitted to the RF front end for further processing, including an IQ modulation, an up conversion, and a power amplification. The PAPR of the analog signal x(t) is several dB higher than the PAPR of the corresponding discrete time sequence x[n], and is close to the PAPR of x[n/R] where x[n/R] represents the sequence obtained by R times oversampling of x[n]. Therefore, the PAPR of x(t) can be approximated by using x[n/R] as follows:

$$PAPR = \frac{\max_{0 \leq n \leq RN-1} |x[n/R]|^2}{E\{|x[n/R]|^2\}} \quad (3)$$

where E{•} is the expectation operation. The approximation is relatively accurate when R≧4. However, one of the main disadvantages of multicarrier communication systems is the high PAPR of the modulated signal. When the modulated signal with a high PAPR passes through the RF front end, the signal is distorted due to the non-linearity of a regular RF amplifier. The non-linearity not only causes the in-band signal distortion which leads to the increase of the bit error rate (BER), but also causes the out-of-band radiation which leads to the interference of adjacent channels, a violation of the government regulation. A straightforward solution to this problem would be using an RF amplifier with a larger linear range. However, the aforementioned solution will lead to the reduction of power efficiency, higher power consumption and a higher manufacturing cost.

There are several conventional methods for solving the aforementioned problem, including block coding, clipping, partial transmit sequences (PTS), selective mapping (SLM), tone reservation (TR), tone injection (TI) and pulse superposition. Among these methods, the PTS method is most attractive due to its relatively low realization complexity and capability in PAPR reduction. Ericsson (U.S. Pat. No. 6,125,103) disclosed a method for using PTS to solve the high PAPR of the signal at the OFDM transmission end, as shown in FIG. 2. The explanation is as follows.

First, the input data X[k] of length N is partitioned in the frequency domain into M disjoint subblocks, represented by $X_1[k], X_2[k], \ldots, X_M[k]$, k=0, 1, . . . , N−1. partition can be interleaved, adjacent, or irregular, as shown in FIG. 3 (using M=4 as an example). The M disjoint subblocks are phase-rotated and added to form the following signal:

$$\tilde{X}[\kappa] = \sum_{m=1}^{M} b_m X_m[\kappa], \kappa = 0, 1, \ldots, N-1 \quad (4)$$

where $b_m$ is the phase rotation parameter of the m-th subblock (m∈{1, 2, . . . , M}) and $|b_m|=1$.

Equation (4), after the N-IFFT, becomes:

$$\tilde{x}[n] = \sum_{m=1}^{M} b_m x_m[n], n = 0, 1, \ldots, N-1 \quad (5)$$

where $x_m[n]$ is the N-IFFT of $X_m[k]$. In the PAPR reduction, the object of the PTS method is the phase optimization, i.e., seeking for the optimal sequence $\{b_1, b_2, \ldots, b_M\}$ so that the PAPR of the transmitted signal is minimum. In practice, the phase of $b_m$ is usually restricted to one of the four possibilities {+1, −1, +j, −j} so that no multiplication operation is required in the phase rotation.

From FIG. 2, it can be seen that an N-point OFDM symbol requires M times of N-IFFT operation. That is, a total of M·(N/2)log$_2$ N complex multiplications are required. Several methods are further devised to reduce the amount of the computation required in the PTS method. Kang, Kim and Joo, in their article "A Novel Subblock Partition Scheme for Partial Transmit Sequence OFDM," IEEE Trans. Broadcasting, vol. 45, no. 3, pp. 333-338, September 1999, disclosed a method of using the characteristics of the PTS interleaved partition of the subblocks, as shown in FIG. 4 (M=8). Each subblock has N points in the frequency domain, but only L points of them have non-zero values (L=N/M). Therefore, the N-IFFT on the N-point subblock $X_m[k]$ is equivalent to the L-IFFT on the L-point subblock (where $X_m[k]$ has non-zero values), repeating M times in the time domain to form the N-point signal, and multiplying the N-point signal with the N-point complex coefficients:

$$(1/M) \cdot e^{j2\pi mn/N}, m=0, 1, \ldots, M-1, n=0, 1, \ldots, N-1$$

This method takes $M \cdot (L/2) \log_2 L + MN$ multiplications, and requires MN units of memory space.

Samsung (U.S. Patent 2003/0,067,866) disclosed a similar method, as shown in FIG. 5. The Samsung method differs from the previous method in no repetition after the L-IFFT on an L-point subblock. Instead, the multiplication of the L-point complex coefficients in the time domain is performed to make the time domain subblocks orthogonal so that the receiving end can separate each subblock. As there are only L points in each time domain subblock, the PAPR is lower, therefore, the PAPR of the transmitted signal after the phase rotation and the addition is also lower. Although this method takes $M \cdot (L/2) \log_2 L + N$ multiplications and requires N units of memory space, this method reduces the length of the OFDM signal from N to L, which means that the capability of anti-multipath channel effect is also greatly reduced. Furthermore, the L-point complex coefficient multiplier to make the time domain subblocks orthogonal is hard to design. This will further make the receiving end more difficult in obtaining the original transmitted data.

SUMMARY OF THE INVENTION

The present invention has been made to overcome the aforementioned drawback of conventional PAPR reduction methods for the OFDM signal. The primary object of the present invention is to provide a PAPR reduction method and apparatus for the OFDM signal. The reduction method uses the characteristics of the interleaved partition of the subblocks of the PTS method. The discrete time sequence x[n] of length N is partitioned in the time domain into a number of disjoint subblocks, and a transformation combination and a phase optimization are performed on the subblocks to obtain a complete N-point signal x̃[n], where N is the length of an OFDM signal, and n=0, 1, ..., N-1.

The present invention only uses one N-IFFF so that the amount of computation is greatly reduced. The present invention takes $(N/2)\log_2 N$ complex multiplications and requires N units of memory space. But more important, the present invention keeps the original capability of anti-multipath channel effect in the OFDM system.

The present invention includes the following steps: (1) partitioning the discrete time sequence x[n] of length N in the time domain into a number of disjoint subblocks, each subblock having the length of N/M, M being a power of 2, and N/M being an integer greater than 1; (2) using a combiner to combine the M disjoint subblocks into M different sequences $y_k[n]$, each having the length of N/M, where k=1, 2, ..., M and n=0, 1, ..., (N/M)−1; and (3) using the symmetric characteristics to phase rotate and add the M sequences $y_k[n]$ to obtain a complete N-point signal x̃[n] having the length of N.

In the present invention, the first and the second embodiments, respectively, using M=2 and M=4, explain the steps of the time-domain method.

The present invention of a PAPR reduction apparatus for an OFDM signal mainly comprises an N-IFFT, a de-multiplexer, a combiner, a set of memory, and an adder. The N-IFFT transforms the frequency-domain input signal X[k] into the time-domain signal x[n]. The de-multiplexer uses the adjacent partitioning to partition x[n] into M disjoint subblocks of identical length. The combiner combines the M disjoint subblocks into M discrete time sequences $y_k[n]$ of length N/M. Use the symmetric characteristics to phase rotate the M sequences $y_k[n]$ and use the adder to add them and obtain a complete N-point signal x̃[n]. The memory is for storing the M disjoint subblocks and the M sequences $y_k[n]$.

When M=4, the present invention shows different results in terms of computation amount and the memory requirements, compared to other three PTS methods. Compared to the original PTS method and the method disclosed by Kang, Kim and Joo, the present invention and the Samsung method have the same minimum computation amount and memory requirement. The present invention does not require shortening the length of the OFDM signal, and therefore keeps the features and advantages of the OFDM system.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 9 shows the phase rotation parameter setting in FIG. 8 when M=2.

FIG. 11 shows the phase rotation parameter setting in FIG. 10 when M=4.

FIG. 12 shows the comparison of the computation amount and the memory requirement between the present invention and the other three methods.

DETAILED DESCRIPTION OF THE PREFERRED EMBODIMENTS

Figure 6:
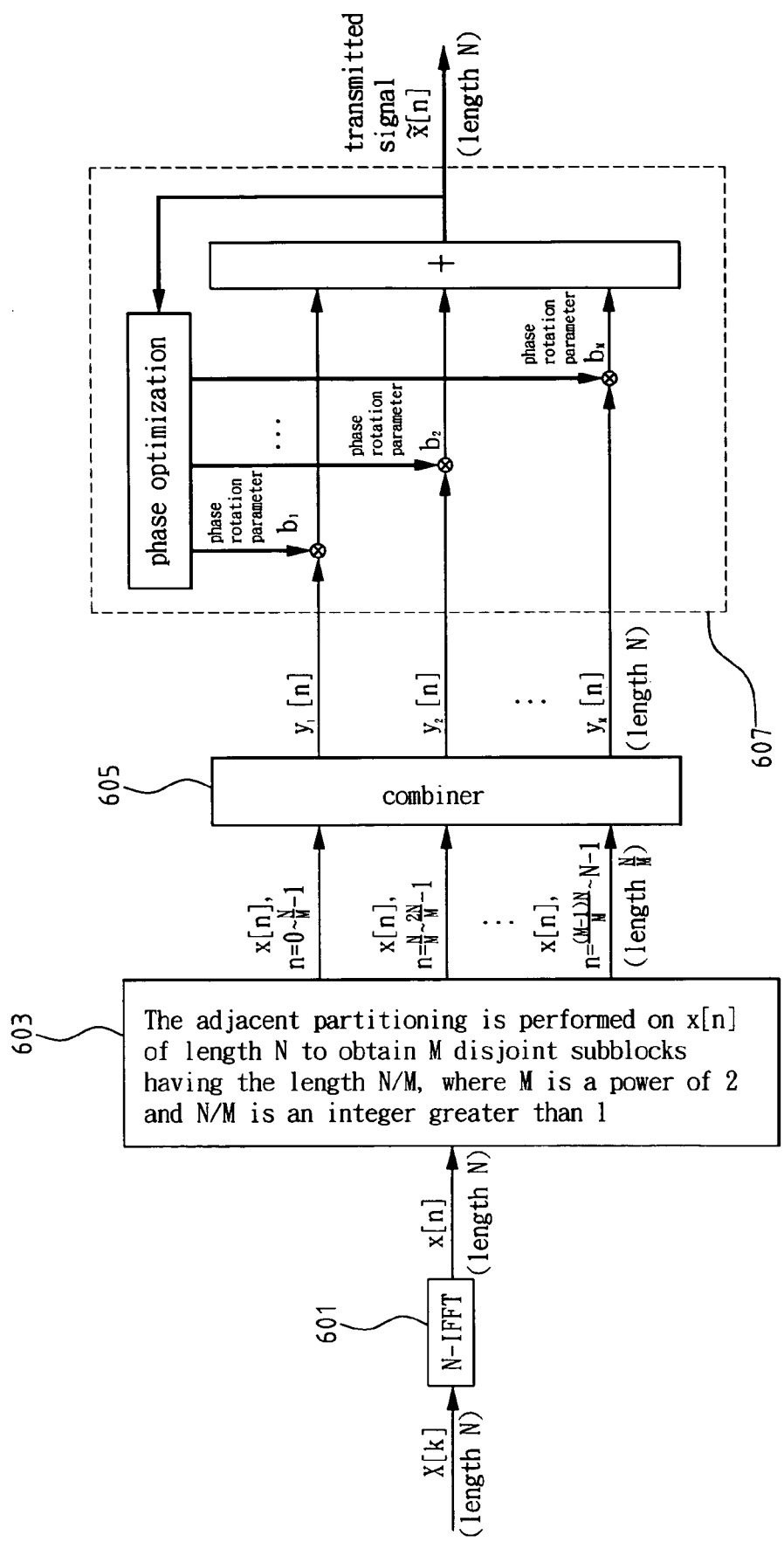
FIG. 6 shows the PAPR reduction method of an OFDM signal according to the present invention.

FIG. 6 shows a schematic view of the present invention of a PAPR reduction method for an OFDM signal. First, the N-IFFT operation 601 is performed on the frequency-domain signal X[k] of length N to obtain the time domain signal x[n] of length N. The adjacent partitioning is performed on x[n] to obtain M disjoint subblocks having the length N/M, where M is a power of 2 and N/M is an integer greater than 1, as in step 603. In step 605, the combiner is used to combine the M disjoint subblocks into M discrete-time sequences $y_1[n], y_2[n], \ldots, y_M[n]$, each having the length N/M. Finally, in step 607, the M discrete-time sequences $y_k[n]$ are phase rotated and added to form a complete N-point transmitted signal x̃[n]:

$$\tilde{x}[n]=b_1y_1[n]+b_2y_2[n]+\ldots+b_My_M[n] \quad (6)$$

Because the sequences $y_k[n]$ are symmetrical, the combiner 605 only needs to form the sequences $\{y_k[0], y_k[1], \ldots, y_k[(N/M)-1]\}$, each having the length N/M.

Figure 7:
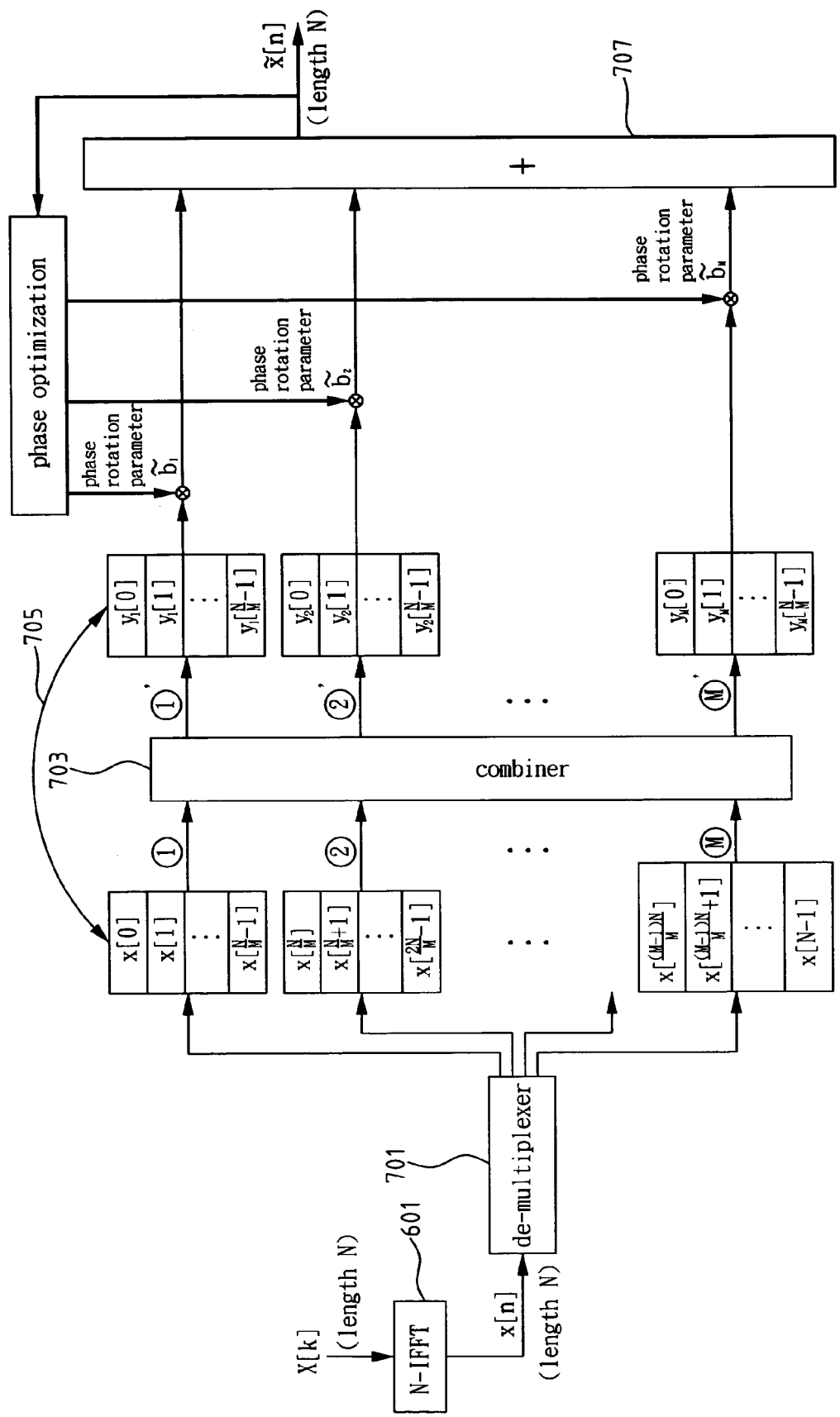
FIG. 7 shows the schematic view of the apparatus according to the present invention for PAPR reduction of an OFDM signal.

In accordance with the method described above, FIG. 7 shows the schematic view of an apparatus for PAPR reduction for an OFDM signal. The apparatus comprises an N-IFFT 601, a de-multiplexer 701, a combiner 703, a set of memory 705, and an adder 707. N-IFFT 601 transforms the frequency-domain input signal X[k] into the time-domain signal x[n]. De-multiplexer 701 partitions the signal x[n] into M adjacent, yet disjoint, subblocks of identical length. Combiner 703 combines the M disjoint subblocks into M sequences $y_k[n]$ of length N/M, where k=1, 2, ..., M and n=0, 1, ..., (N/M)−1. The M sequences $y_k[n]$, after the phase rotation, are added by the adder 707 to obtain a segment of the transmitted signal $\{\tilde{x}[0], \tilde{x}[1], \ldots, \tilde{x}[(N/M)-1]\}$, having the length N/M. By using different phase rotation parameter $b_k$, the next segment of the transmitted signal $\{\tilde{x}[N/M], \tilde{x}[(N/M)+1], \ldots, \tilde{x}[(2N/M)-1]\}$ can be obtained from the M sequences $y_k[n]$. By repeating the process, the complete transmitted signal $\tilde{x}[n]$ can be obtained. The M disjoint subblocks and the M sequences $y_k[n]$ are stored in the memory 705.

Figure 1:
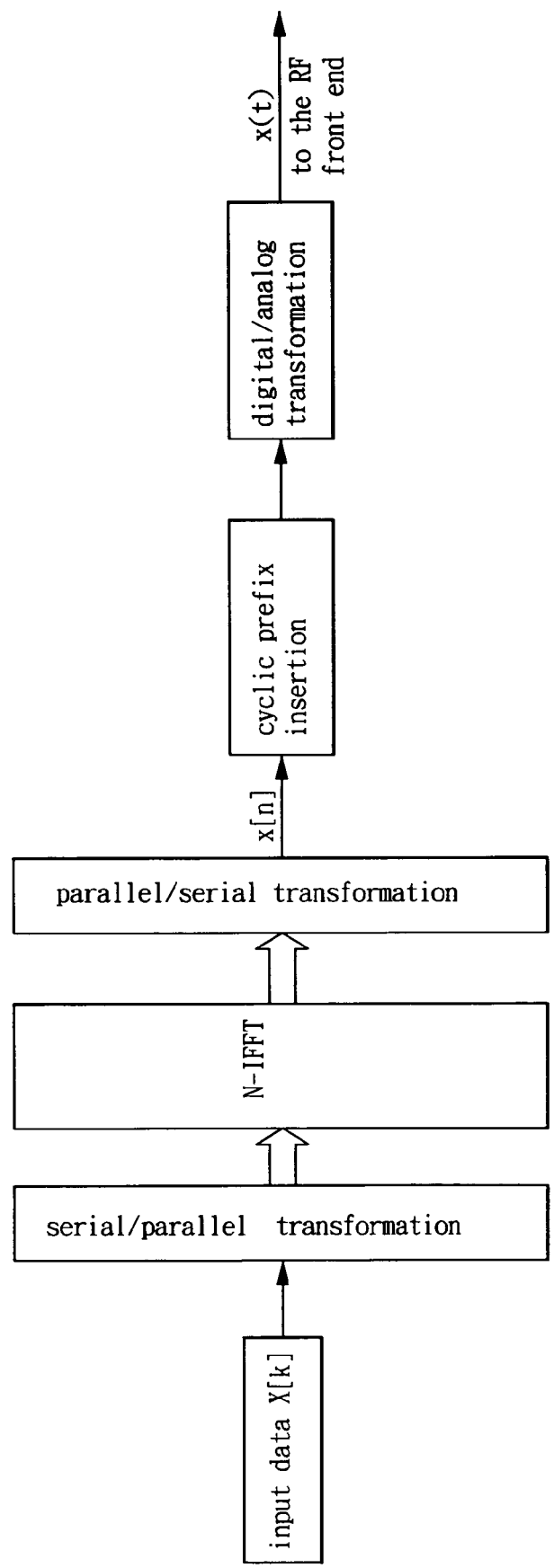
FIG. 1 shows a schematic view of a conventional OFDM transmitter.
Figure 2:
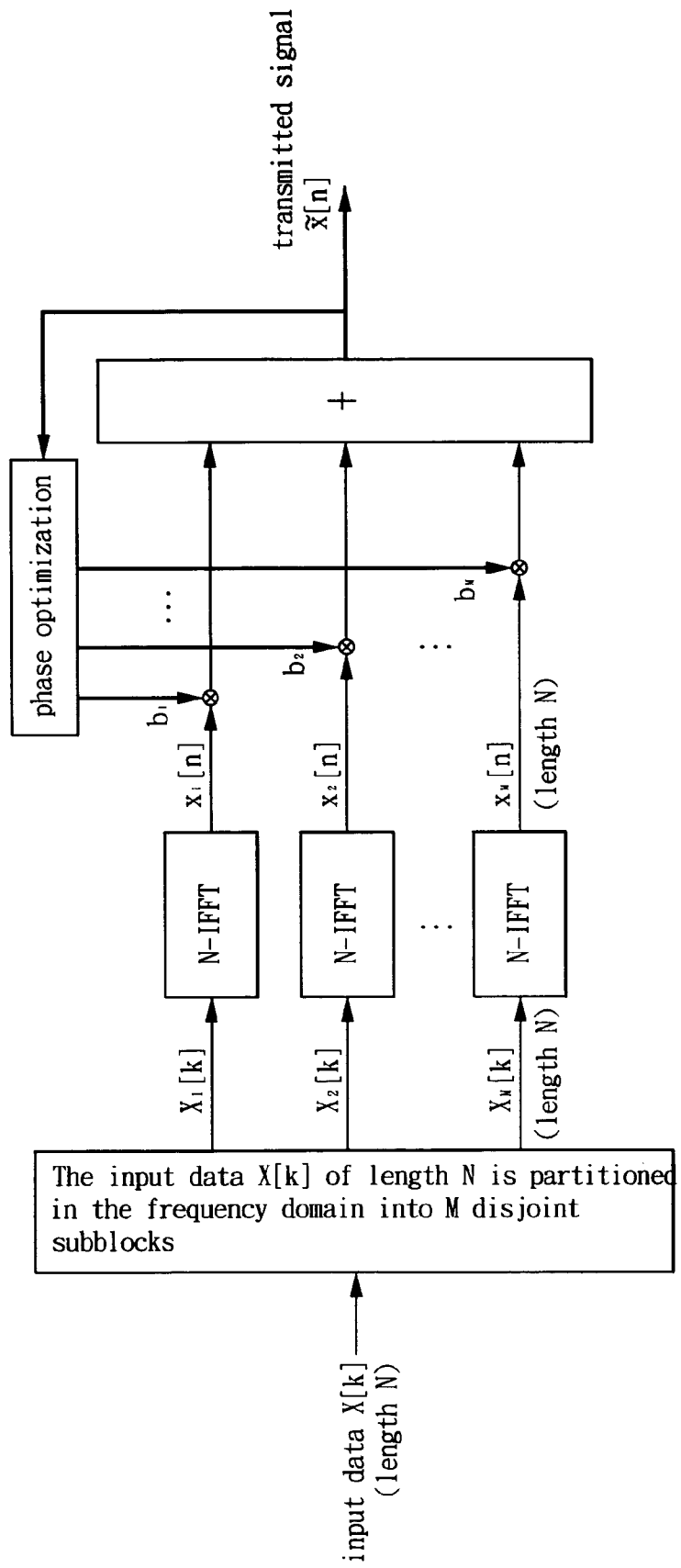
FIG. 2 shows a PTS method to solve the high PAPR problem of OFDM signal at transmission end.
Figure 3:
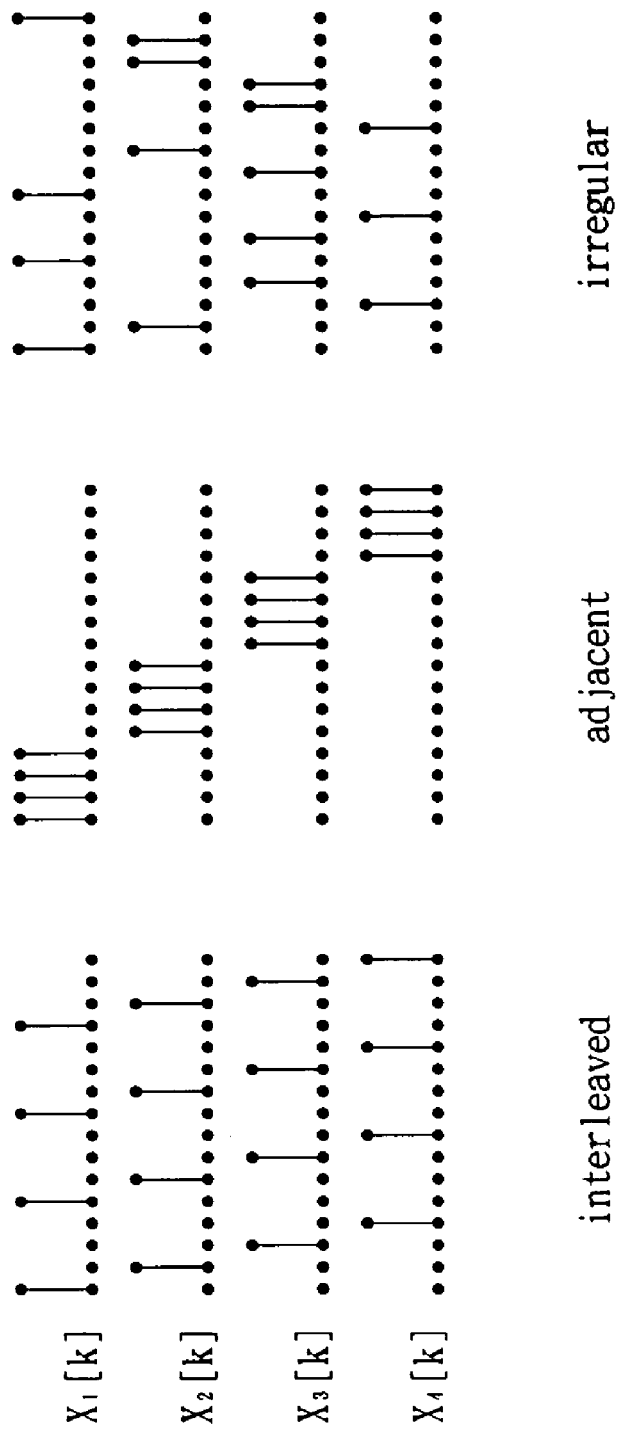
FIG. 3 shows the three ways of partitioning the input data X[k] into subblocks.
Figure 4:
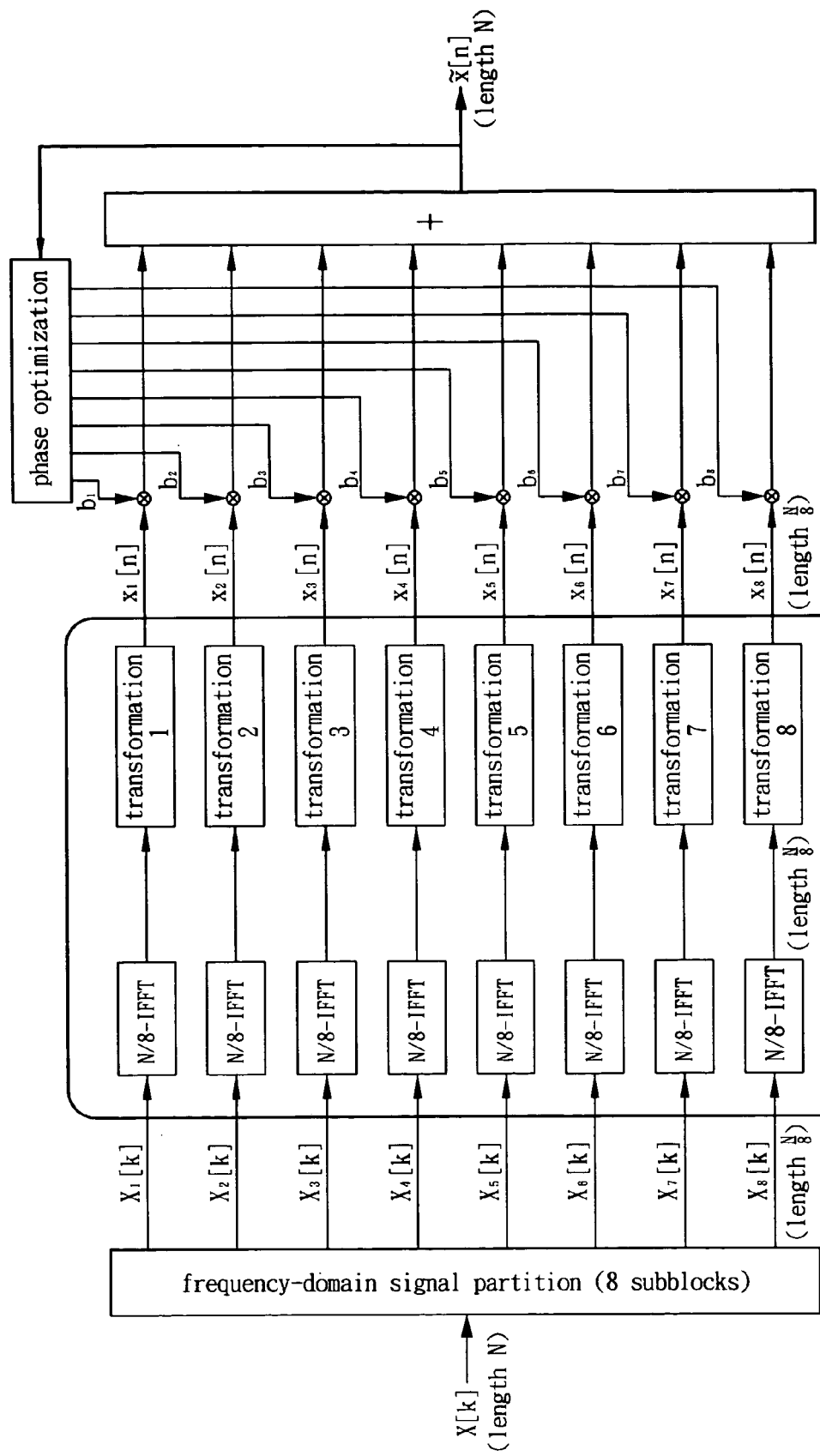
FIG. 4 shows the method proposed by Kang, Kim and Joo to reduce the computation amount of PTS.
Figure 5:
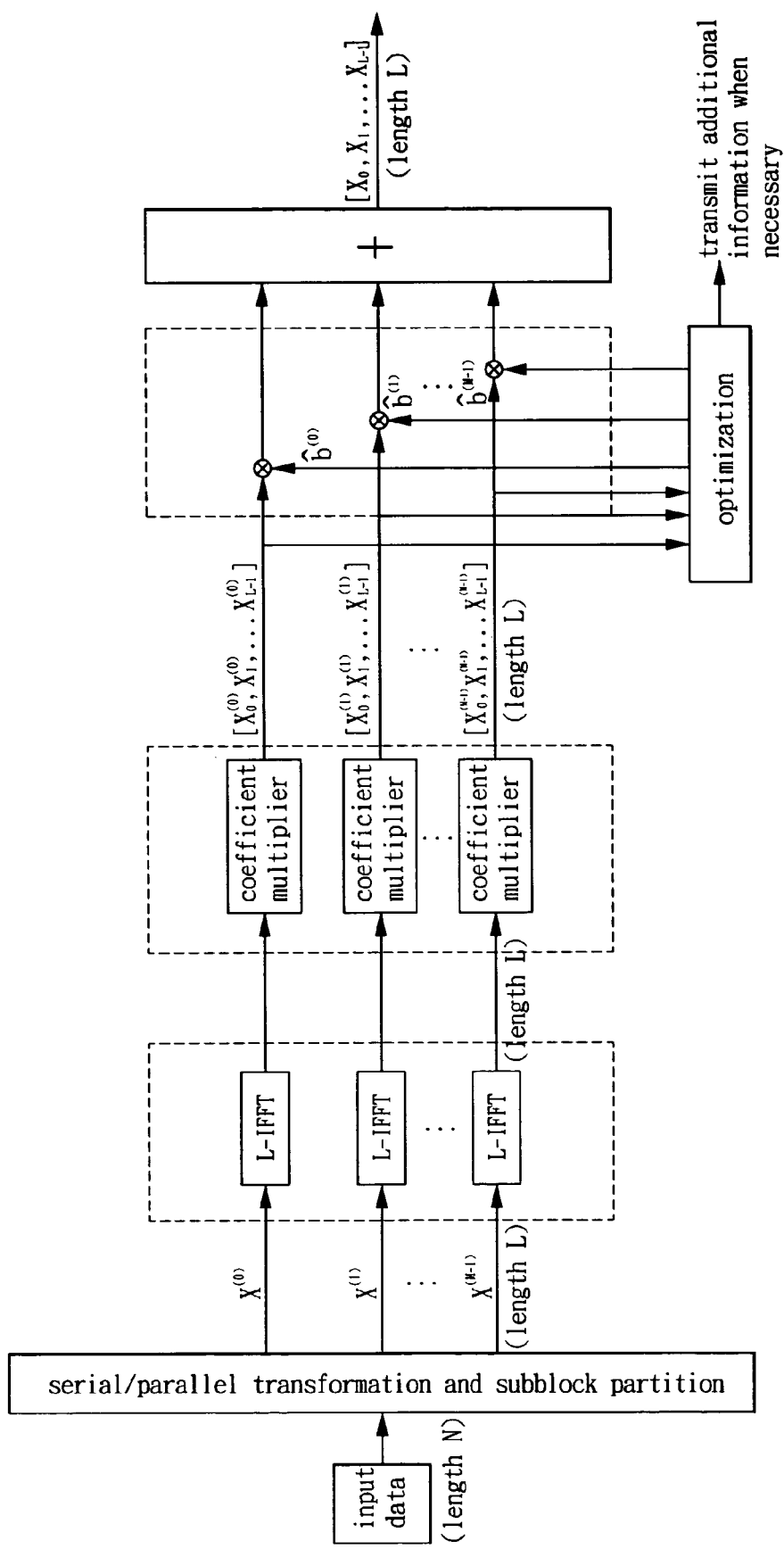
FIG. 5 shows the method proposed by Samsung to reduce the computation amount and memory requirement of PTS.
Figure 8:
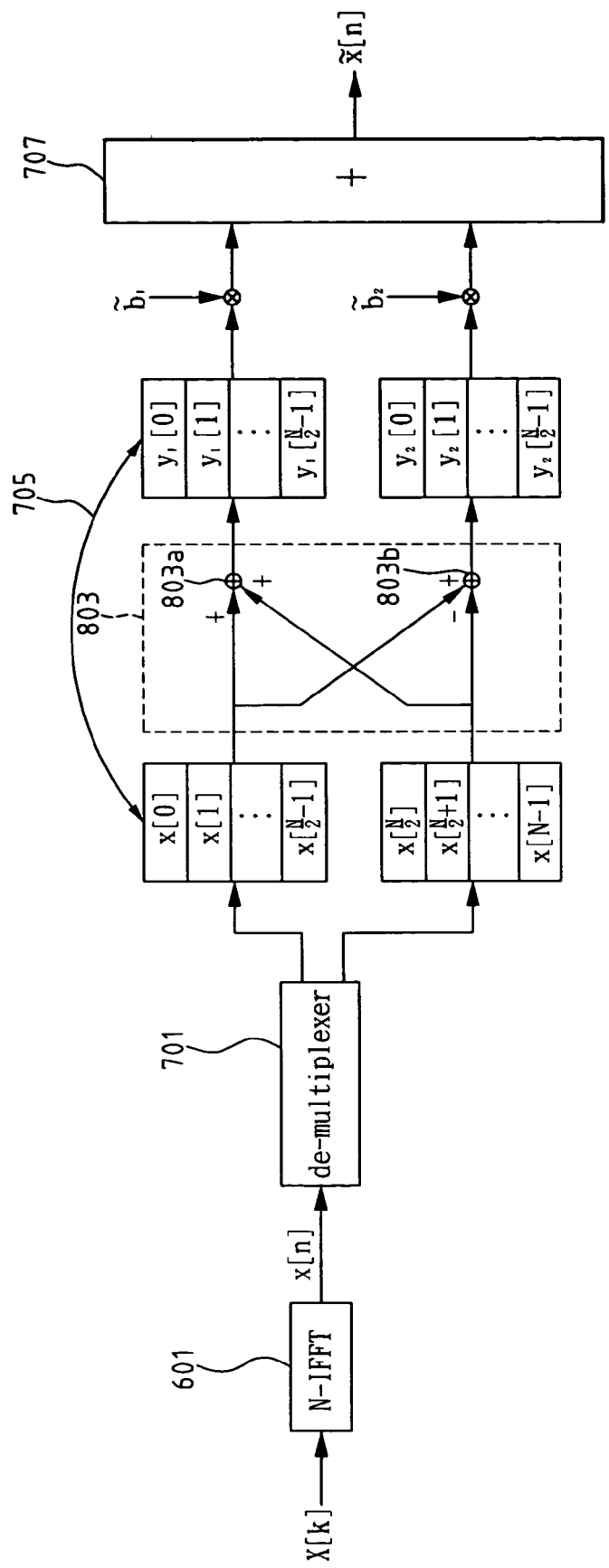
FIG. 8 shows the first embodiment of the present invention in FIG. 7.

As shown in FIG. 8, when M=2, the sequence x[n], n=0, 1, ..., N−1, is partitioned by de-multiplexer 701 into two subblocks $\{x[0], x[1], \ldots, x[(N/2)-1]\}$ and $\{x[N/2], x[(N/2)+1], \ldots, x[N-1]\}$, each having the length N/2. Both subblocks are stored in memory 705. Combiner 803 combines the two subblocks into the following two discrete time sequences, each having the length N:

$$y_1[n]=x[n]+x[((n-N/2))_N]$$

$$y_2[n]=x[n]-x[((n-N/2))_N] \quad (7)$$

where $((\bullet))_N$ is the N-point circular shift, n=0, 1, ..., N−1. Combiner 803 has a simple structure of two adders, 803a and 803b, similar to that of 2-IFFT. It can be proved that the discrete-time sequences $y_1[n]$ and $y_2[n]$ obtained from equation (7) are identical to the discrete-time sequences $x_1[n]$ and $x_2[n]$ obtained by the original PTS in FIG. 2. From equation (7), the following equation can be obtained:

$$y_1[((n+N/2))_N]=y_1[((n-N/2))_N]=x[((n-N/2))_N]+x[n]=y_1[n]$$

$$y_2[((n+N/2))_N]=y_2[((n-N/2))_N]=x[((n-N/2))_N]-x[n]=-y_2[n] \quad (8)$$

In other words, $$y_1[N/2]=y_1[0], y_1[N/2+1]=y_1[1], \ldots, y_1[N-1]=y_1[N/2-1]$$

$$y_2[N/2]=-y_2[0], y_2[N/2+1]=-y_2[1], \ldots, y_2[N-1]=-y_2[N/2-1] \quad (9)$$

Figure 10:
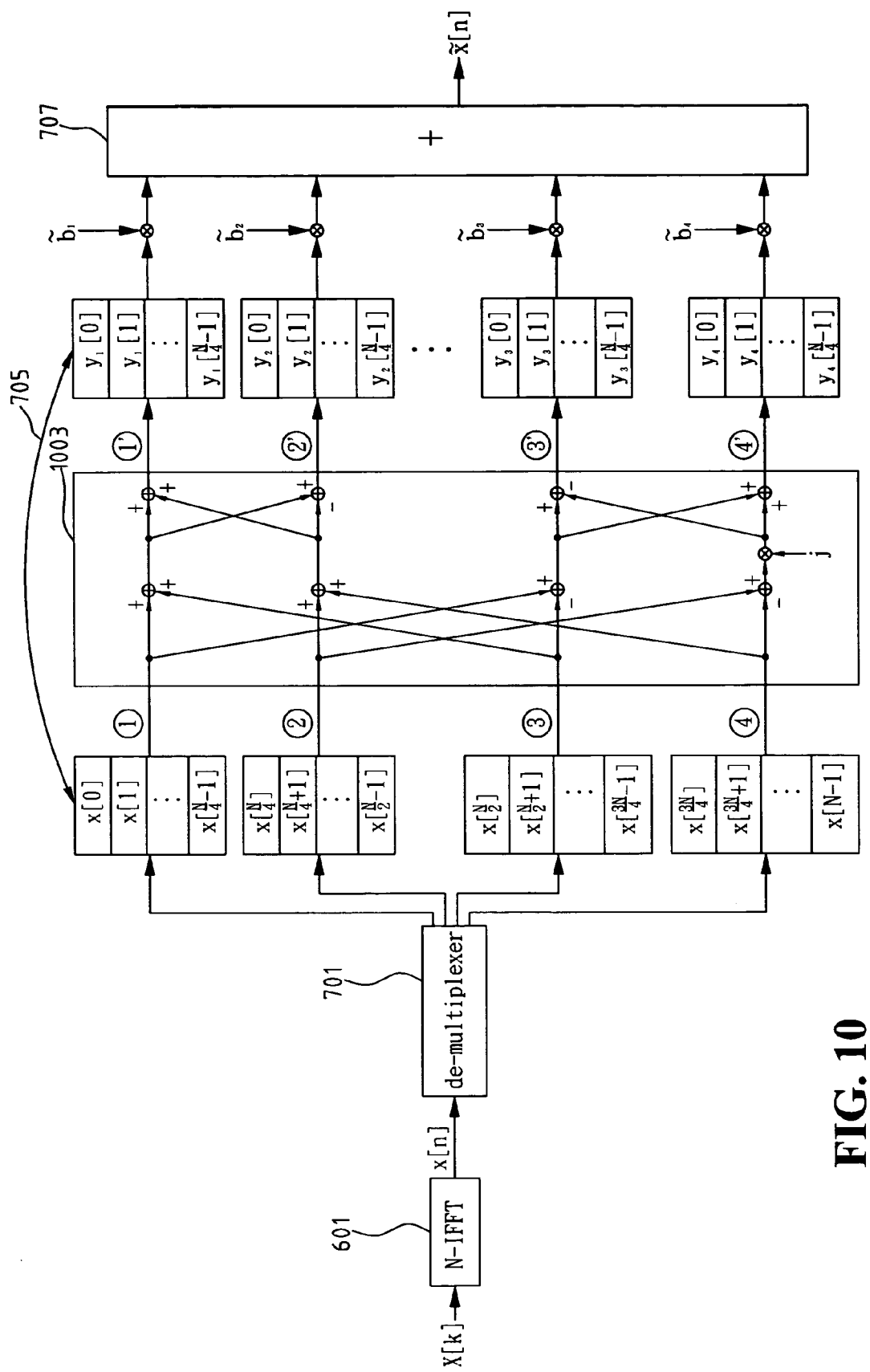
FIG. 10 shows the second embodiment of the present invention in FIG. 7.

Therefore, combiner 803 only needs to form the sequences $\{y_1[0], y_1[1], \ldots, y_1[(N/2)-1]\}$ and $\{y_2[0], y_2[1], \ldots, y_2[(N/2)-1]\}$ of length N/2. Because the sequence $\{x[0], x[1], \ldots, x[N-1]\}$ is no longer needed, memory 705 can be released to store $\{y_1[0], y_1[1], \ldots, y_1[(N/2)-1]\}$ and $\{y_2[0], y_2[1], \ldots, y_2[(N/2)-1]\}$. In other words, the memory requirement is N units. Finally, from equation (6) and equation (9), the following can be obtained:

$$\tilde{x}[n]=b_1y_1[n]+b_2y_2[n]$$

$$\tilde{x}[n+N/2]=b_1y_1[n]-b_2y_2[n] \quad (10)$$

where n=0, 1, ..., (N/2)−1. Equation (10) can be further expressed as:

$$\tilde{x}[n+pN/2]=\tilde{b}_1y_1[n]+\tilde{b}_2y_2[n], p=0,1 n=0,1,\ldots, N/2-1 \quad (11)$$

where phase rotation parameters $\tilde{b}_1$ and $\tilde{b}_2$ are as shown in FIG. 9. FIG. 8 shows that when $\tilde{b}_k$ is +1, −1, +j, or −j, the present invention takes (N/2)log$_2$ N complex multiplications, all from N-IFFT 601, and requires N units of memory. When M=4, the schematic view is shown in FIG. 10. The sequence x[n], n=0, 1, ..., N−1, is partitioned by de-multiplexer 701 into four subblocks $\{x[0], \ldots, x[(N/4)-1]\}$, $\{x[N/4], \ldots, x[(N/2)-1]\}$, $\{x[N/2], \ldots, x[(3N/4)-1]\}$ and $\{x[3N/4], \ldots, x[N-1]\}$, each having the lengtrh N/4. Combiner 1003 combines the four subblocks into the following four discrete time sequences, each having the length N:

$$y_1[n]=x[n]+x[((n-N/2))_N]+x[((n-N/4))_N]+x[((n-3N/4))_N]$$

$$y_3[n]=x[n]+x[((n-N/2))_N]-x[((n-N/4))_N]-x[((n-3N/4))_N]$$

$$y_2[n]=x[n]-x[((n-N/2))_N]+jx[((n-N/4))_N]-jx[((n-3N/4))_N]$$

$$y_4[n]=x[n]-x[((n-N/2))_N]-jx[((n-N/4))_N]+jx[((n-3N/4))_N] \quad (12)$$

Combiner 1003 uses 8 adders and an imagery j multiplicator to implement equation (12). The structure is similar to that of 4-IFFT. It can be proved that the discrete-time sequences $y_1[n]$, $y_2[n]$, $y_3[n]$ and $y_4[n]$ obtained from equation (12) are identical to the discrete time sequences $x_1[n]$, $x_2[n]$, $x_3[n]$ and $x_4[n]$ obtained by the original PTS in FIG. 2. Similarly, by using the symmetric characteristic, the following equation can be obtained:

$$\tilde{x}[n+pN/4]=\tilde{b}_1y_1[n]+\tilde{b}_2y_2[n]+\tilde{b}_3y_3[n]+\tilde{b}_4y_4[n], p=0,1,2,3, \quad (13)$$

where n=0, ..., (N/4)−1, and the phase rotation parameter $\tilde{b}_k$ is as shown in FIG. 11. FIG. 10 shows that when $\tilde{b}_k$ is +1, −1, +j, or −j, the present invention takes (N/2)log2 N complex multiplications, and requires N units of memory.

FIG. 12 shows the comparison of the amount of computation and the memory requirement of the present invention and the other three PTS methods, for M=4 and N=64, 256, 1024, and 2048. As can be seen from FIG. 12, the amount of computation and the memory requirement increases as N increases. Compared to the original PTS and the method disclosed by Kang, Kim and Joo, the present invention and the Samsung method takes the minimum number of multiplications and requires the minimum memory space. Both take the same number of multiplications, 192, 1024, 5120 and 11264, respectively; and both require the same amount of memory space, 64, 256, 1024, 2048 units of memory, respectively. However, the PTS method of the present invention does not shorten the length of the OFDM signal, and therefore keeps the features and the advantages of the original OFDM system.

In summary, the present invention uses the interleaved characteristics of subblock partition of the PTS method, and uses only an N-IFFT to provide a method and an apparatus for PAPR reduction for an OFDM signal. The present invention only takes (N/2)log$_2$ N complex multiplications and requires only N units of memory space. Furthermore, the present invention keeps the features and the advantages of the original OFDM system.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for peak-to-average power ratio (PAPR) reduction for an orthogonal frequency division multiplexing (OFDM) signal, comprising the steps of:
   (a) partitioning a discrete-time sequence x[n] of length N into M disjoint subblocks directly in time domain, each subblock having a length of N/M, M being a power of 2, and N/M being an integer greater than 1;
   (b) using a combiner to combine said M disjoint subblocks into M different sequences $y_k[n]$, each having a length of N/M, where k=1, 2, . . . , M and n=0, 1, . . . , (N/M)−1; and
   (c) phase rotating said M sequences $y_k[n]$ and adding them together to obtain a complete N-point transmitted signal $\tilde{x}[n]$, where N is the length of said OFDM signal, and n=0, 1, . . . , N−1.

2. The method as claimed in claim 1, wherein said discrete-time sequence x[n] is obtained by an inverse fast Fourier transform (IFFT) from a frequency domain input data sequence.

3. The method as claimed in claim 1, wherein M is 2.

4. The method as claimed in claim 3, wherein in said step (b), said sequences $y_k[n]$ are made of the following two subblocks, each having a length N/2:

$$y_1[n]=x[n]+x[((n-N/2))_N]$$

$$y_2[n]=x[n]-x[((n-N/2))_N]$$

where $((\cdot))_N$ represents an N-point circular shift, n=0, 1, . . . , (N/2)−1.

5. The method as claimed in claim 3, wherein in said step (c), phase values used for the step of phase rotating said M sequences $y_k[n]$ include +1 and −1.

6. The method as claimed in claim 1, wherein M is 3.

7. The method as claimed in claim 6, wherein in said step (b), said sequences $y_k[n]$ are made of the following four subblocks, each having a length N/4:

$$y_1[n]=x[n]+x[((n-N/2))_N]+x[((n-N/4))_N]+x[((n-3N/4))_N]$$

$$y_3[n]=x[n]+x[((n-N/2))_N]-x[((n-N/4))_N]-x[((n-3N/4))_N]$$

$$y_2[n]=x[n]-x[((n-N/2))_N]+jx[((n-N/4))_N]-jx[((n-3N/4))_N]$$

$$y_4[n]=x[n]-x[((n-N/2))_N]-jx[((n-N/4))_N]+jx[((n-3N/4))_N]$$

where $((\cdot))_N$ represents an N-point circular shift, n=0, 1, . . . , (N/4)−1.

8. The method as claimed in claim 6, wherein in said step (c), phase values used for the step of phase rotating said M sequences $y_k[n]$ include +1, −1, +j, and −j.

9. An apparatus for peak-to-average power ratio (PAPR) reduction of an orthogonal frequency division multiplexing (OFDM) signal, comprising:
   a de-multiplexer for partitioning an input discrete-time sequence x[n] of length N into M adjacent, yet disjoint, subblocks of identical length, where n=0, 1, . . . , N−1, N is an integer greater than 1, M is a power of 2, and N/M is an integer greater than 1;
   a combiner for combining said M disjoint subblocks into M discrete-time sequences $y_k[n]$ of length N/M, where k=1, 2, . . . , M and n=0, 1, . . . , (N/M)−1;
   an adder for adding said M sequences $y_k[n]$, after phase rotation, to obtain a complete N-point transmitted signal $\tilde{x}[n]$; and
   a set of memory for storing said M disjoint subblocks and said M sequences $y_k[n]$.

10. The apparatus as claimed in claim 9, wherein M is 4, and said combiner is implemented with eight adders and a multiplier for an imaginary number j.

11. The apparatus as claimed in claim 9, wherein M is 2, and said combiner is implemented with two adders.

12. The apparatus as claimed in claim 9, wherein said apparatus only requires an N-point inverse fast Fourier transform for computing said input discrete-time sequence x[n] from a frequency domain input data sequence.

* * * * *